Aug. 25, 1931.   L. A. McLAIN   1,820,082
CROOKED HOLE INDICATOR
Filed Aug. 31, 1929
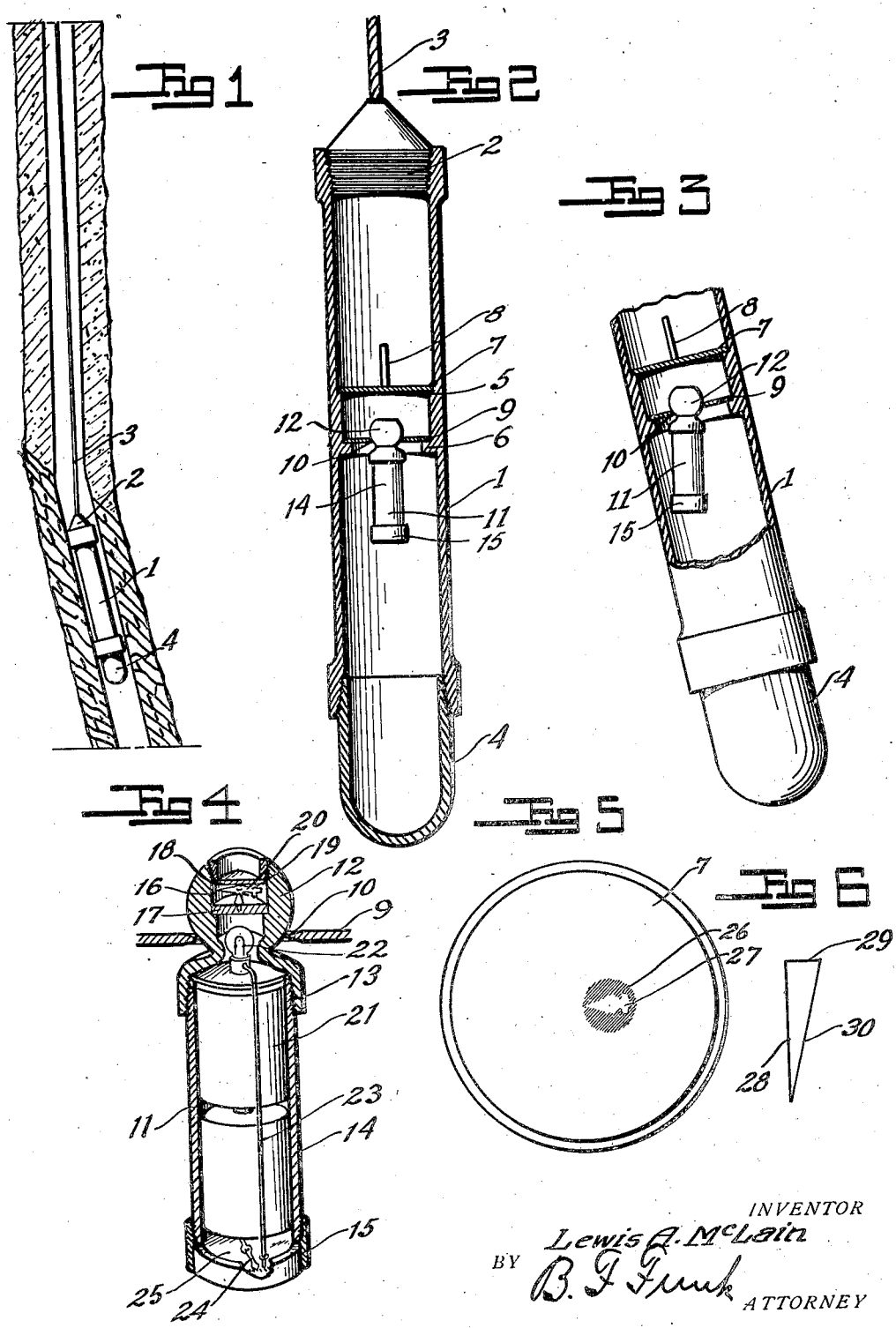
INVENTOR
Lewis A. McLain
BY B. T. Funk
ATTORNEY Patented Aug. 25, 1931

1,820,082

UNITED STATES PATENT OFFICE

LEWIS A. McLAIN, OF WICHITA, KANSAS

CROOKED HOLE INDICATOR

Application filed August 31, 1929. Serial No. 389,851.

This invention relates to means for determining the angle of deviation from the perpendicular in the hole of a deep well.

In drilling oil wells, the drilling tools are frequently diverted from a straight line so that the hole is "crooked". That is, it deviates from the perpendicular and it is desirable to determine the extent of the angular deviation as well as the direction in which the deviation takes place. I have provided means for accurately indicating both the angle and the direction of the angle and the invention consists in certain parts and combinations of parts, all of which will be specifically described hereinafter, reference being had to the accompanying drawings in which:

Fig. 1 is a vertical sectional view through part of the oil well hole showing my invention applied.

Fig. 2 is a vertical sectional view through the outer casing, the camera being shown in elevation.

Fig. 3 is a fragmentary view of the outer casing showing the position of the camera when the outer casing is deflected from the perpendicular.

Fig. 4 is a sectional view through the camera casing, the light source and battery cells being shown in elevation.

Fig. 5 is an enlarged view of the sensitized element on which the camera projects an image and Fig. 6 is a diagram of the angle of deflection.

The outer casing 1 is shown as comprising a lightproof tube having a threaded plug 2 in its top connected to a line 3 by means of which the casing can be lowered into the well. The lower end of the tube is closed by a concave member 4. Within the tube 1 are two shoulders 5 and 6 in spaced relation one above the other. The shoulder 5 supports a disc 7 of sensitized material such as a photographic plate or film having a stem 8 extending upwardly therefrom so that the sensitized element can be removed after the plug 2 is taken out of the tube. The shoulder 6 supports a removable disc 9 having a centrally located opening 10, the edge of which is preferably drawn to a knife edge to swingingly support the camera 11.

The camera is shown more specifically in Figure 4 as consisting of a head member 12 substantially spherical with a threaded skirt 13 engaging a tubular casing 14 having a removable bottom cap member 15. The head member 12 hangs on the knife edge of the opening 10 so that the camera may maintain a vertical position irrespective of the position of the outer casing 1. The head is provided with a central opening or bore 16 in which is a lens 17 and spaced above the lens is a glass plate 18. Between the lens 17 and the plate 18 is a magnetized light obstructing needle 19 pivoted on a vertical axis and substantially like a compass needle in that it always points to the north. The point 20 of the needle is of a definite shape to provide a definite shadow on the sensitized member, the point being termed a "flag". Within the casing 14 is a source of electrical current 21 which may consist of one or more secondary battery cells adapted to energize a light source such as a small incandescent lamp 22. A wire 23 leads from the light source to an electric switch 24 electrically connected to the battery cell or cells 21. The electric switch arm 24 is connected to a clock mechanism 25 which can be set to close the switch after a given time. For example, the clock or watch mechanism, of ordinary construction not shown, will cause the switch arm to contact with wire 23 after a period of time, say five or ten minutes. For this purpose, the switch arm can be attached to the hand operating shaft of the clock or watch mechanism.

When the parts are assembled and the clock or watch mechanism has been set, the device will be lowered into the well until it reaches the crooked part of the hole. This will cause the casing 1 to be deflected from a straight line but the camera will still have its longitudinal axis in a perpendicular line. Then, when the clock or watch mechanism has moved the switch arm 24 to contact with wire 23, the lamp 22 will be illuminated. It will project its light through the lens 17 and through the glass 18 on to the sensitized plate or film 7 to expose a spot to the light out of line with the longitudinal center of the member 7 as indicated at 26. The "flag" of the compass needle will indicate the position of north on the sensitized member so irrespective of where the spot 26 appears, the position of north will be indicated by the unexposed portion 27. Then, by using the diagram, Figure 6, and assuming 28 to be equal to the radius of the disc 7 and the line 29 the distance from the center of the disc 7, the line 30 connecting the ends of lines 28 and 29 will give the angle of deflection in the hole. Of course, it is to be understood that the sensitized film or plate 7 will have to be developed after it is removed from the casing 1.

The clock or watch mechanism will be set to give ample time to lower the device into the hole before the light source is energized. This can be readily estimated by knowing the depth in the hole at which the crooked part of the hole exists.

It will therefore be apparent that a photographic indication can be easily made both as to the angle of deviation and the degree of deflection from the perpendicular.

What I claim and desire to secure by Letters Patent is:—

1. A device of the class described comprising a light proof casing, means for supporting a disk of sensitized material within the casing, a shoulder within the casing below the sensitized sheet supporting means having a central opening with a knife edge surrounding the opening, a spherical cap in the opening bearing upon the knife edge, a storage battery case supported by the cap, a light source energized by storage batteries in the case, a lens in the cap above the light source, and a magnetic needle above the lens and beneath the sensitized sheet supporting means.

2. A device of the class described comprising a light proof case, a sensitized member within the casing, a light projecting means below the sensitized member having a spherical head, a shoulder within the light proof casing, a disk resting on the shoulder having an opening surrounding the head to permit the light projecting means to have free swinging movement, a compass needle between the light source and the sensitized member and time controlled means for energizing the light projecting means.

In testimony whereof I affix my signature.

LEWIS A. McLAIN.